United States Patent [19]

Copeland

[11] Patent Number: 5,666,153
[45] Date of Patent: Sep. 9, 1997

[54] RETRACTABLE TELECONFERENCING APPARATUS

[75] Inventor: David J. Copeland, Minneapolis, Minn.

[73] Assignee: Virtual Shopping, Inc., Houston, Tex.

[21] Appl. No.: 538,792

[22] Filed: Oct. 3, 1995

[51] Int. Cl.$^6$ ................................................. H04M 11/00
[52] U.S. Cl. ...................... 348/15; 348/20; 348/373; D14/113; D14/125; D16/208; D16/211; D16/229
[58] Field of Search ................ 348/14–20; 354/293; 379/96–99, 110, 90, 202; D14/102–104, 106, 100, 113, 114, 125, 126, 129, 132; D16/200, 211, 201, 229, 232, 208

[56] References Cited

U.S. PATENT DOCUMENTS

| | | |
|---|---|---|
| 3,755,623 | 8/1973 | Cassagne . |
| 4,075,657 | 2/1978 | Weinblatt . |
| 4,400,725 | 8/1983 | Tanigaki . |
| 4,710,873 | 12/1987 | Breslow et al. . |
| 4,821,307 | 4/1989 | Flint, III . |
| 4,845,636 | 7/1989 | Walker . |
| 4,928,301 | 5/1990 | Smoot ........................... 348/20 |
| 5,012,348 | 4/1991 | Witzel et al. ................... 348/373 |
| 5,111,498 | 5/1992 | Guichard et al. . |
| 5,117,285 | 5/1992 | Nelson et al. . |
| 5,168,354 | 12/1992 | Martinex et al. . |
| 5,194,955 | 3/1993 | Yoneta et al. . |
| 5,359,362 | 10/1994 | Lewis et al. . |
| 5,382,972 | 1/1995 | Kannes . |
| 5,400,068 | 3/1995 | Ishida et al. . |
| 5,406,323 | 4/1995 | Tanigaki et al. . |
| 5,412,417 | 5/1995 | Tozuka . |

*Primary Examiner*—Wing F. Chan
*Attorney, Agent, or Firm*—David M. Klein; Bryan Cave LLP

[57] ABSTRACT

A retractable video teleconferencing apparatus for a video monitor having an optical axis. An optical assembly includes a housing mounted to the video monitor; a track for moving the housing between a retracted position and a forward position in which the housing is positioned forward of the video monitor; a beamsplitter hingedly attached to the housing and movable between a first position in which the beamsplitter is positioned across the optical axis at an angle relative thereto, whereby optical images directed toward the display along the optical axis are at least partially reflected by the beamsplitter, and a second position in which the beamsplitter is retracted into the housing; and a video camera located in the housing and positioned relative to the beamsplitter for receiving the partially reflected images and for generating a video signal corresponding to the partially reflected images. The beamsplitter, in the first position, is mounted at a 45° angle relative to the optical axis. An adjustable bracket secures the track to the video monitor. The housing may include a pair of retractable wings extending laterally therefrom to block out stray light. An opaque panel positioned below the beamsplitter and hinged thereto blocks stray images from the beamsplitter.

21 Claims, 6 Drawing Sheets

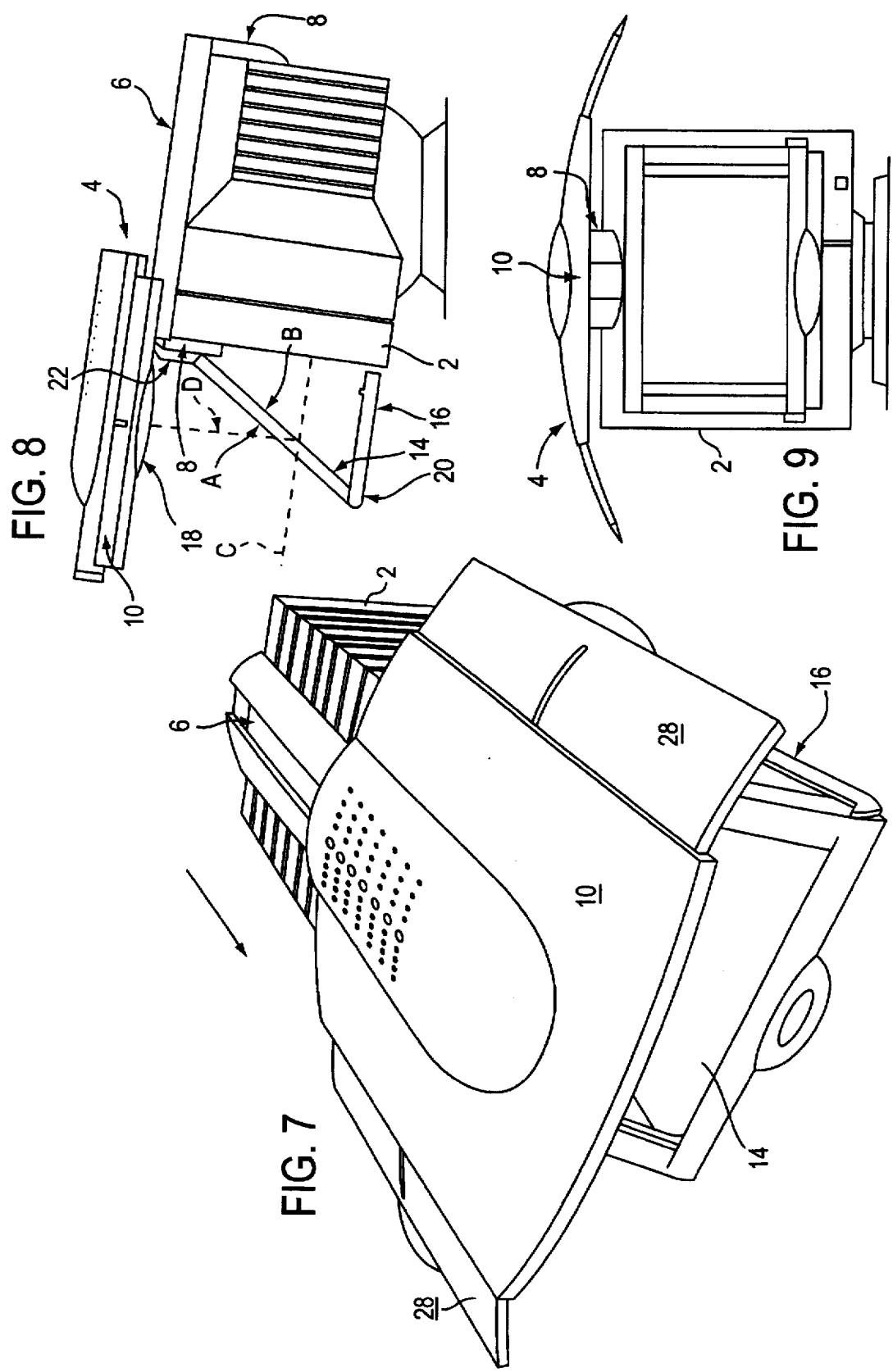

RETRACTABLE TELECONFERENCING APPARATUS

BACKGROUND OF THE INVENTION

1. Field of the Invention.

The present invention relates to video teleconferencing systems, and more particularly to a video teleconferencing apparatus that enables direct eye contact between participants in a teleconference and that may be retracted to enable ordinary use of the monitor when a video teleconference is not in session.

2. Description of the Related Art.

Video teleconferencing systems enable two or more parties to participate in remote conversation with accompanying near real-time video. As shown in FIG. 1, in a conventional video teleconferencing system, each party communicates by means of a teleconferencing station 100. For processing the video portion of the conversation, each teleconferencing station includes a display device 102, i.e., a monitor or CRT, for displaying the other party/parties to the conversation, and a video camera 104 for transmitting video to the other parties to the conversation. The video camera 104 is mounted adjacent to the display 102, just above or to the side of the display screen.

A problem with such systems is that the optical paths 106 and 108 for the display device 102 and the video camera 104 are divergent. As a result, a participant in a teleconferencing session appears to be talking to the other session participants without eye contact. This reduces the impact, interest and sincerity of the message being communicated by the speaker, and may even be interpreted as a lack of honesty.

In order to overcome this problem, several devices have been developed. Tanigaki, U.S. Pat. No. 4,400,725, relates to a video display device and video pickup device which are arranged on a common optical axis. In this device, the video display is placed in front of the video camera and comprises display elements made of a trans-illumination controllable material. The camera is mounted on a common optical axis of the display device, and may be mounted inside of or behind the display. This type of device is very expensive to manufacture and is not suitable to retrofit an existing monitor.

Martinez et al., U.S. Pat. No. 5,168,354, relates to a drive-thru restaurant system in which the patron may maintain eye-to-eye contact with an attendant in the restaurant. The system includes an attendant station in the restaurant having a video monitor positioned to project the image of the customer to the attendant. The attendant station also includes a video camera mounted at eye-level which picks up the eye-level video image of the attendant and transmits this image to a second video monitor located at the remote order station. A mirror, such as reflective one-way glass, mounted within the attendant station allows the attendant to view the video monitor while simultaneously looking directly at the video camera.

This device suffers from several shortcomings. First, it is relatively large and bulky, and therefore not suitable for use in an office or home environment. Second, the video monitor is mounted above the video camera facing downward, which is not a desirable configuration. Finally, the device is not suitable for retrofitting an existing monitor to create a teleconferencing system.

In another type of teleconferencing apparatus sold by Tekskil™ Industries, Inc. under the tradename "EyeLine", as shown in FIG. 2, a frame 206 is mounted to a conventional video monitor 214. Mounted within the frame 206 and covering the face of the display is a beamsplitter 208 which is mounted at a 45° angle relative to the display. A secondary mirror 210 also mounted within the frame reflects the image reflected by the beamsplitter 208 onto a conventional video camera 212. Beamsplitter 208 transmits 50% of the light which is directed toward it, and reflects the remaining 50%. Thus, a person utilizing the system may look directly at the monitor, and see the video display of the other party to the conversation while maintaining eye contact.

While this device is capable of being retrofitted to an existing video monitor, it is relatively complicated to do so. In addition to mounting the frame to the monitor, it is necessary to also mount the video camera to the monitor in a separate step. Since these elements are mounted separately, it is necessary to properly align them when setting up the system. The optics are also subject to being knocked out of alignment during normal use of the device.

FIG. 3 shows a further teleconferencing apparatus in which an optical assembly is mounted to a video monitor having an optical axis "C". A housing 302 is secured to the video monitor 304 adjacent to the display. A beamsplitter 306 is mounted within the housing crossing the optical axis so that optical images directed toward the display along the optical axis are partially reflected by the beamsplitter. A video camera 308 is mounted within the housing positioned relative to the beamsplitter for receiving the partially reflected images and for generating a video signal corresponding to the partially reflected images. The beamsplitter is mounted at a 45° angle relative to the optical axis. Since the relationship between the beamsplitter and the camera is fixed, no optical adjustment is required. The housing is secured to the monitor in a manner so that it may be retrofitted to an existing video monitor.

The housing of this device must be attached to the monitor in proper alignment each time the device is to be used, which is inconvenient. Once removed, the housing requires storage space. Also, each time the device is attached to and removed from the display, there is a risk of damage to the device and electrical cable associated with the camera. Accordingly, it would be desirable to have a video teleconferencing apparatus that is capable of retrofitting an existing monitor and which does not have to be removed from the monitor to make full normal use of the monitor.

SUMMARY OF THE INVENTION

The present invention is a retractable video teleconferencing apparatus for use with a video monitor having an optical axis. An optical assembly is mounted to the display. The optical assembly includes:

a) a beamsplitter mounted to the display and movable between a first position in which the beamsplitter is positioned across the optical axis at an angle relative thereto, whereby optical images directed toward the display along the optical axis are at least partially reflected by the beamsplitter, and a second position in which the beamsplitter is retracted from the optical axis; and b) a video camera positioned relative to the beamsplitter for receiving the partially reflected images and for generating a video signal corresponding to the partially reflected images.

The beamsplitter, in the first position, is preferably mounted at a 45° angle relative to the optical axis. The video camera, which has a camera axis, is mounted with the camera axis perpendicular to the optical axis. The optical assembly includes a housing mounted to the video monitor, with the camera being mounted in the housing, and the beamsplitter being contained in the housing when the beamsplitter is in the second position. The optical assembly is preferably mounted to the video monitor on a track so that the optical assembly is movable between an operating position in which the beamsplitter can move between the first position and the second position, and a retracted position in which the optical assembly is moved toward the rear of the video monitor with the beamsplitter in the second position. The track may be secured to the video monitor by an adjustable bracket suitable for use with monitors of different depths. The housing may include one or more retractable wings extending laterally from the housing to block out extraneous light. Also, the optical assembly may include an opaque panel positioned below the beamsplitter.

BRIEF DESCRIPTION OF THE DRAWINGS

FIG. 7 is an elevated perspective view of the video teleconferencing system of the present invention in an operating position.

FIG. 8 is a side view of the video teleconferencing system of the invention in an operating position.

FIG. 9 is a front view of the video teleconferencing system of the present invention in an operating position.

DETAILED DESCRIPTION OF THE INVENTION

Figure 1:
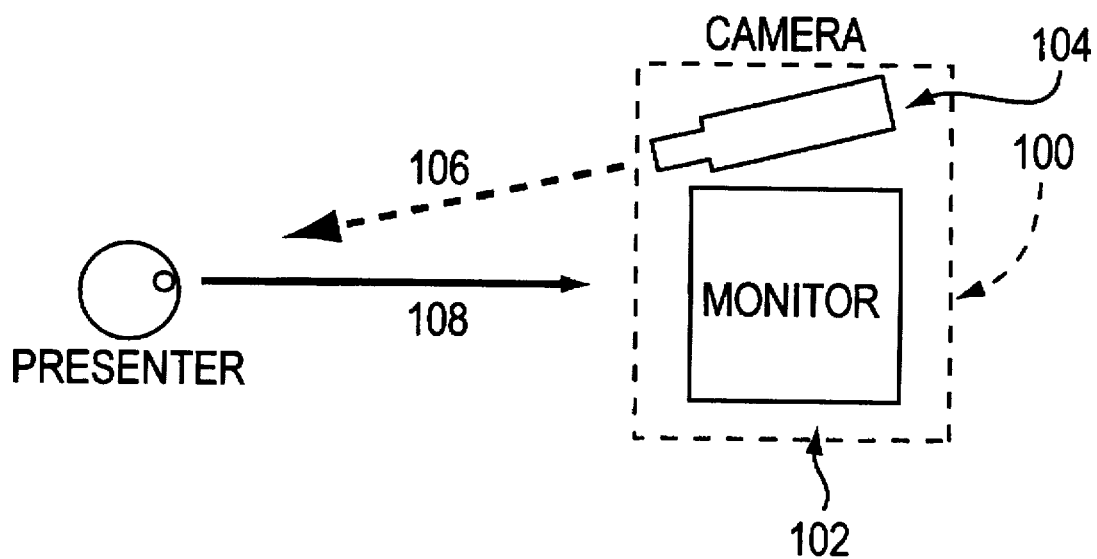
FIG. 1 is a schematic side view of a conventional prior-art teleconferencing system.
Figure 2:
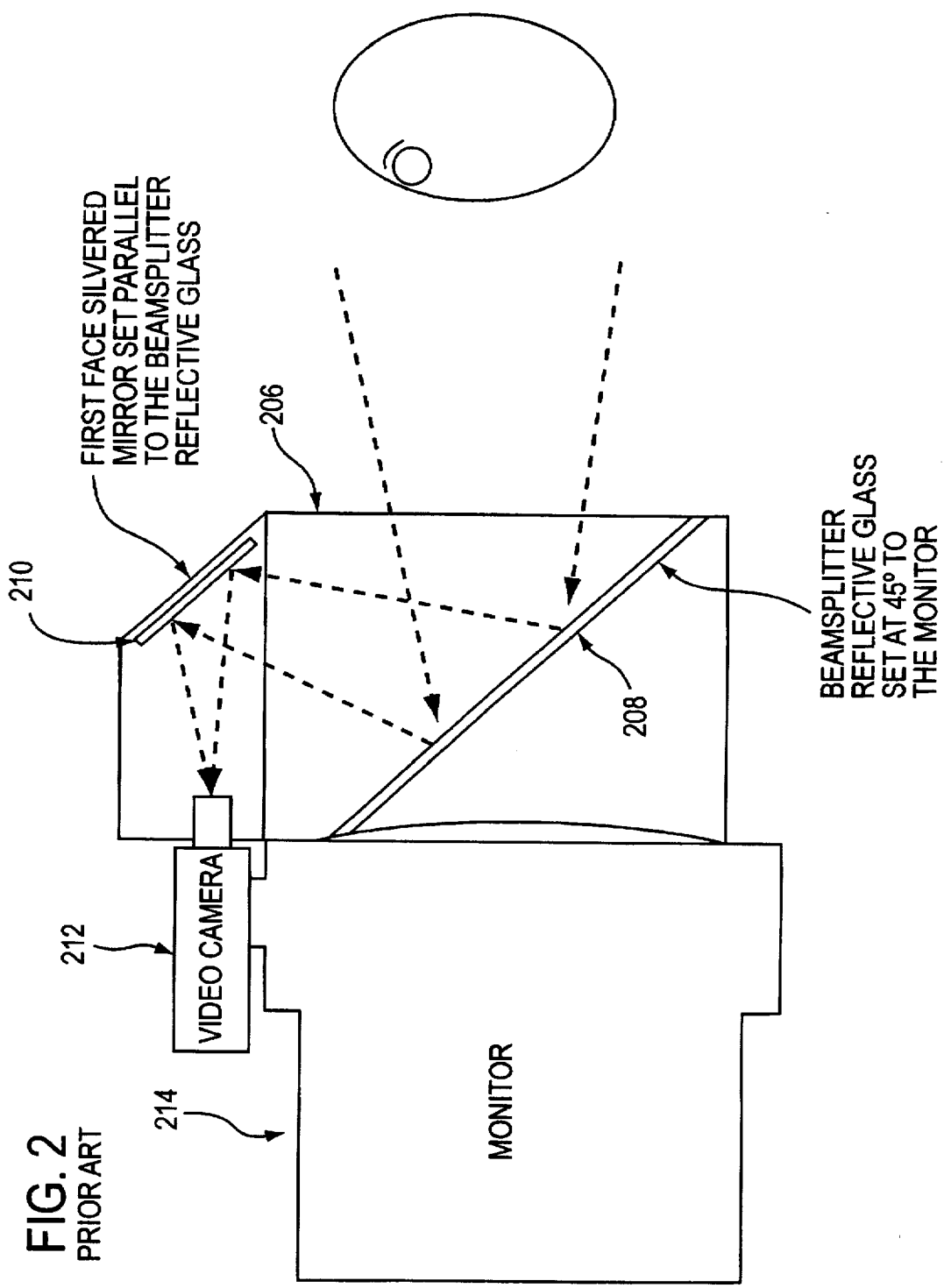
FIG. 2 is a cross-sectional side view of another prior-art teleconferencing system.
Figure 3:
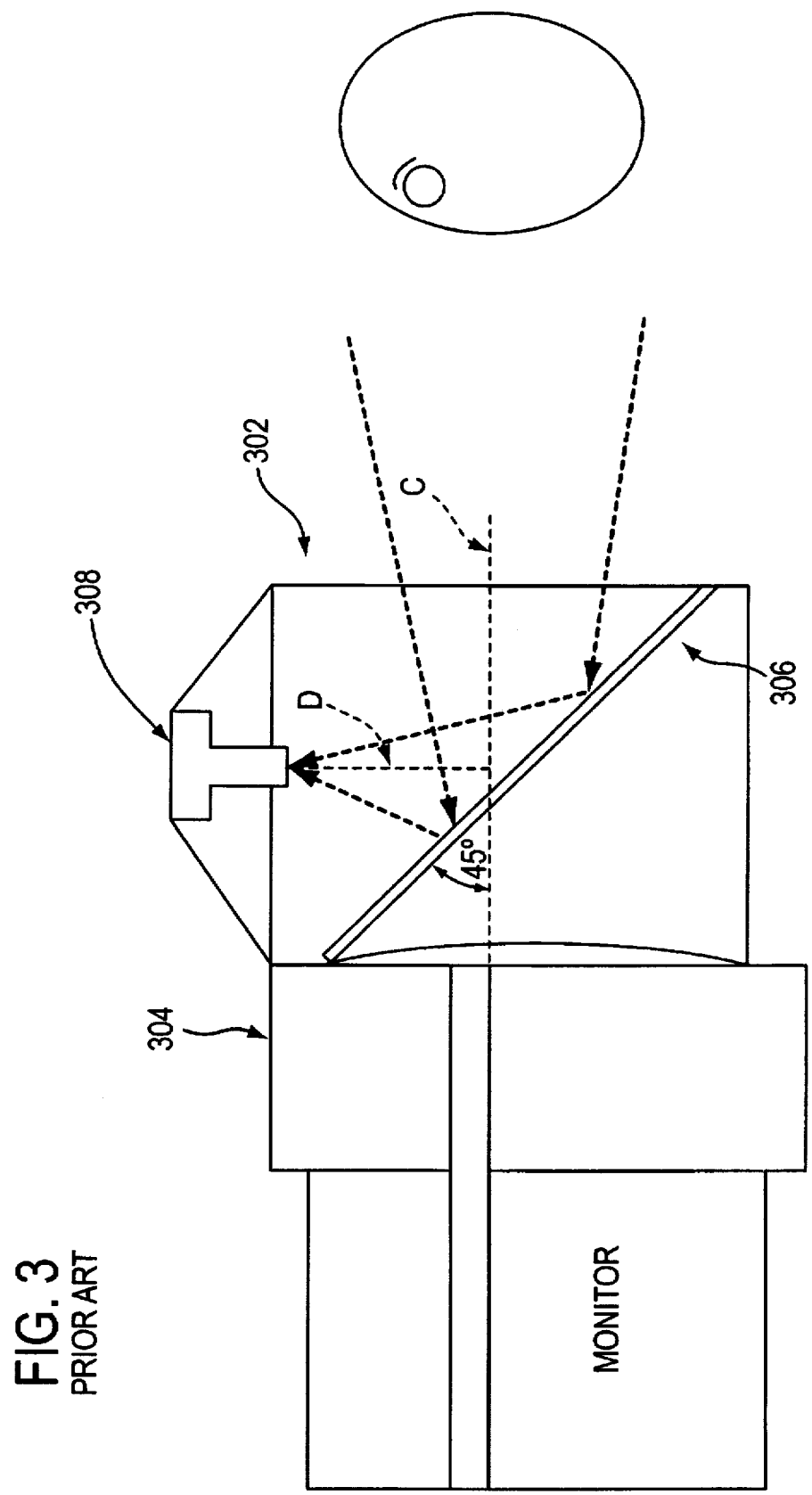
FIG. 3 is a cross-sectional side view of still another prior-art teleconferencing system.

As shown in FIGS. 4-10, the present invention is an apparatus that enables a conventional video monitor 2 to be retrofitted for use in a video teleconferencing system, or which may be used in a free-standing video teleconferencing system. A video monitor 2, preferably a conventional computer monitor, CRT or television set, displays the video image of a party to a teleconference on a display 12. Display 12 has an optical axis "C" which is a preferred line-of-sight for direct eye contact between participants in the video teleconference. In order to use the monitor 2 for video teleconferencing, an optical assembly 4 is secured to the monitor. As shown in FIGS. 4-9, optical assembly 4 includes a track 6, attachment brackets 8, a housing assembly 10, a video camera 18, a beamsplitter 14 and an opaque panel 16.

FIG. 7-10 show the video teleconferencing system of the present invention in an operating position during which it would be used to conduct a video teleconference. When the video teleconferencing system is pulled forward, i.e., toward the front of the video monitor, a beamsplitter 14 lowers in front of the video monitor 2. Beamsplitter 14 is preferably lowered in front of the video monitor 2 at a 45° angle relative to the optical axis C.

The purpose of the beamsplitter 14 is to reflect the image of a participant in a video conversation to a camera, as discussed below, while still enabling a video image generated on display 12 to be seen by the user. Accordingly, it will be appreciated that the ideal beamsplitter 14 for the present application would reflect 100% of the image of the user focused on side A of the beamsplitter 14 to the camera system, while transmitting 100% of the image generated by the video display 12 against side B of the beamsplitter 14.

In practice, beamsplitter 14 is preferably a conventional beamsplitter that is made of a coated reflective glass such that 50% of the incident light is reflected and 50% is transmitted through the glass. One beamsplitter of this type is manufactured by EMF™. The monitor image when viewed through the beamsplitter glass using such a beamsplitter is clear and readable. In an alternative embodiment, beamsplitter 14 may transmit 70% and reflect 30% of the incident light. It is foreseen that the system will operate with a higher or lower ratio of transmission/reflection, although this may result in a degradation of the image seen by one or more of the participants in the conversation. If desired, the camera may amplify the image it receives, or software may be used to perform such amplification so that a beamsplitter having a higher transmission percentage may be used.

Since the beamsplitter 14 may alter the appearance of the display 12 depending upon the transmission/reflection characteristics of the beamsplitter, it is preferable that the beamsplitter 14 cover the entire visible display 12 so that it be uniform in appearance to the user rather than being only partially covered by the beamsplitter 14. In practice, a beamsplitter covering a lesser amount of the screen may be sufficient to reflect the entire image of the user to the camera system.

An opaque panel 16 is attached to the lower portion of beamsplitter 14 by conventional hinges. Because beamsplitter 14 is partially transmissive and partially reflective, items that are located below the beamsplitter will appear in the video camera. Opaque panel 16 is constructed of a dark colored, preferably black, opaque material so that the video camera will not pick up images of items, e.g., the keyboard, that are located below the beamsplitter, and so that the camera will not pick up images of the opaque panel itself such as if the panel were a light color. Opaque panel 16 is preferably constructed of a light-weight plastic, but may be constructed of metal or any other opaque material. The hinge that attaches panel 16 to beamsplitter 14 preferably includes a stop (not shown) that prevents panel 16 from rotating below a desired position at which panel 16 will provide the maximum blockage of stray images. During storage, opaque panel 16 preferably folds up and attaches to beamsplitter 14 by mean of cooperating resilient detents located on opaque panel 16 and beamsplitter 14. It is foreseen that any appropriate latching mechanism may be used to secure the opaque panel to the beamsplitter.

Mounted within the housing 10 is a video camera 18 having a camera axis D. Video camera 18 is preferably mounted so that the camera axis D is oriented perpendicularly to optical axis C and at a 45° angle relative to the beamsplitter 14. In this manner, the image reflected from side A of beamsplitter 14 is picked up without distortion by the lens of the camera and converted to an appropriate video signal. Video camera 18 is preferably mounted within the housing 10 by any appropriate means known to those skilled in the art.

Housing 10 is preferably constructed of a conventional plastic material and may include a bulbous portion to provide sufficient space for the circuitry to operate the video camera 18. If desired, a pair of retractable wings 28 may be provided. Wings 28 are constructed of an opaque plastic, preferably of the same material as the housing 10. Wings 28 slide into and out of housing 10 as desired to block out unwanted light that would cause a glare on the beamsplitter 14.

It will be appreciated that the present video teleconferencing apparatus may be mounted to any of the sides of the video monitor 2 provided that the beamsplitter 14 is rotated accordingly so that the image from side A of the beamsplitter 14 is reflected into the camera 18, and provided that means is provided for moving the beamsplitter 14 in front of display 12. The relationship between the beamsplitter 14 and the camera 18 is preferably fixed so that the optical paths do not require adjustment by the user, although a suitable adjustment mechanism may be provided for initial installation of the device.

Camera 18 is preferably a conventional color CCD camera, such as the camera and electronics used in the Sharp™ YH-7B50. Such cameras typically have dimensions of about 3 inches or less in each dimension including the lens. Of course, any appropriate video camera may be used for the present application, provided that the camera is lightweight and small. Electrical connections to the video camera may be provided by any conventionally known means.

Figure 5:
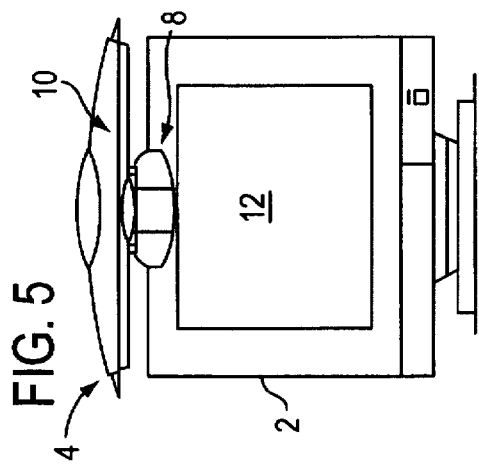
FIG. 5 is a front view of the video teleconferencing system of the present invention in a retracted position.
Figure 6:
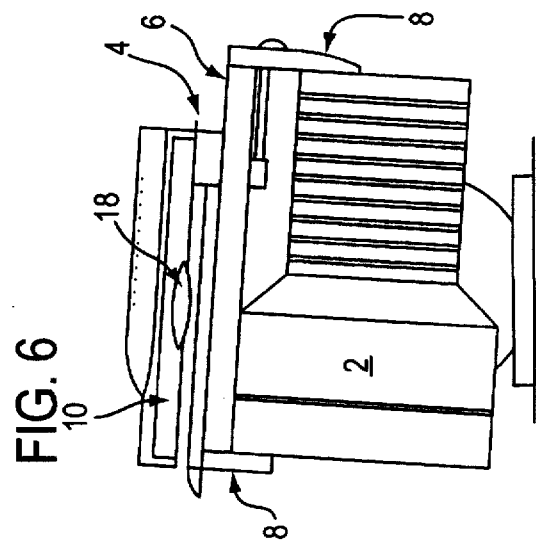
FIG. 6 is a side view of the video teleconferencing system of the present invention in a retracted position.
Figure 4:
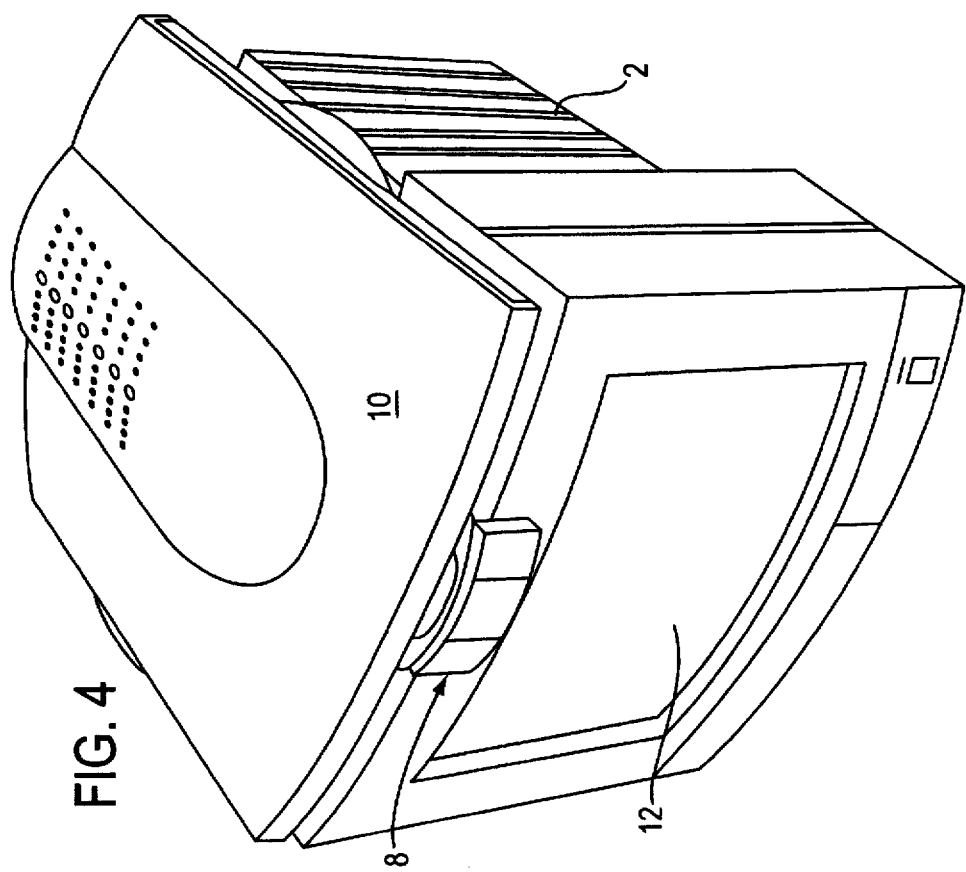
FIG. 4 is an elevated perspective view of the video teleconferencing system of the invention in a retracted position.
Figure 10:
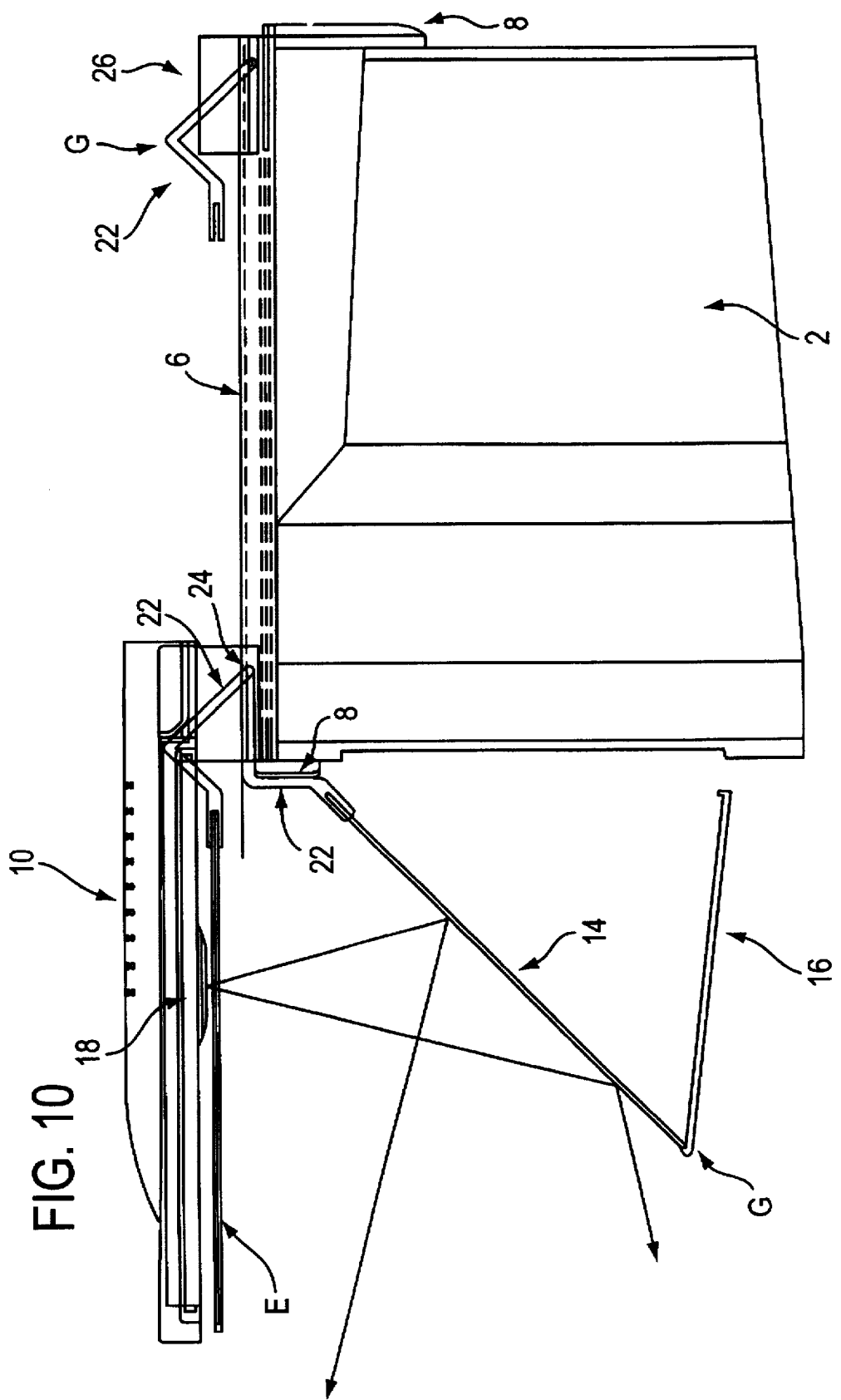
FIG. 10 is a cross-sectional side view of the video teleconferencing system of the present invention showing various positions of the beamsplitter and swing arm.

A swing arm 22 connects beamsplitter 14 to housing 10 by means of a pivot 24 and truck 26. Position "E" as shown in FIG. 10 shows the beamsplitter and swing arm retracted into the housing. A torsion spring or pneumatic damper (not shown) is attached to swing arm 22 in order that, when housing 10 is moved to the operating position, the beamsplitter will move down in front of screen display 12 in a controlled manner, as shown in Position "F". With the beamsplitter in upper position E, the housing assembly 10 along with beamsplitter 14, swing arm 22, and camera 18 may be slid toward the back of the monitor along track 6 to a fully retracted position. Position "G" shows the position of the swing arm in the fully retracted position. FIGS. 4–6 show optical assembly 4 in its retracted position.

Track 6 is preferably constructed of aluminum, or of any appropriate material. Swing arm 22 and housing 10 are preferably attached to truck 26 that rides within the track. Alternatively, any appropriate track configuration may be used.

Track 6 is attached to the monitor by means of a compression vice constructed of end brackets 8. At least one of the end brackets 8 is preferably adjustable by a screw actuation mechanism that enables the bracket to move relative to the track. In this manner, the optical assembly 4 may be attached to monitors of different depths. In the alternative, any appropriate mechanism for attaching the track 6 to the video monitor may be utilized.

While the present invention has been described with respect to the optical systems necessary to provide a video teleconferencing system with direct eye contact, appropriate conventional audio pickups and speakers will necessarily be included in such a system. Many possible audio pickup/speaker configurations exist which will be appreciated by those skilled in the art.

More broadly, although the present invention has been described in detail with respect to certain embodiments and examples, variations and modifications exist which are within the scope of the invention as defined in the following claims.

I claim:

1. A retractable video teleconferencing apparatus for a video monitor, the video monitor comprising a display having an optical axis, the retractable video teleconferencing apparatus comprising:
   a) a beamsplitter mounted to the display and movable between a first position in which the beamsplitter is positioned across the optical axis at an angle relative thereto, whereby optical images directed toward the display along the optical axis are at least partially reflected by the beamsplitter, and a second position in which the beamsplitter is not positioned across the optical axis; and
   b) a video camera positioned relative to the beamsplitter for receiving the partially reflected images and for generating a video signal corresponding to the partially reflected images.

2. The apparatus according to claim 1 wherein the beamsplitter, in the first position, is mounted at a 45° angle relative to the optical axis.

3. The apparatus according to claim 2 wherein the video camera has a camera axis, the camera being mounted with the camera axis perpendicular to the optical axis.

4. The apparatus according to claim 1 wherein the video camera has a camera axis, the camera being mounted with the camera axis perpendicular to the optical axis.

5. The apparatus according to claim 1 further comprising a housing mounted to the video monitor, the camera being mounted in the housing, the beamsplitter being contained in the housing in the second position.

6. The apparatus according to claim 1 further comprising a track mounted to the video monitor, wherein the teleconferencing apparatus is movable between an operating position in which the beamsplitter can move between the first position and the second position, and a retracted position in which the teleconferencing apparatus is moved toward the rear of the video monitor with the beamsplitter in the second position.

7. The apparatus according to claim 5 further comprising a track mounted to the video monitor, wherein the housing is movable between an operating position in which the beamsplitter can move between the first position and the second position, and a retracted position in which the housing is moved toward the rear of the video monitor with the beamsplitter in the second position.

8. The apparatus according to claim 1 further comprising bracket means for securing the teleconferencing apparatus to the monitor.

9. The apparatus according to claim 5 wherein the housing further comprises at least one retractable wing extending laterally from the housing.

10. The apparatus according to claim 1 further comprising an opaque panel positioned below and hinged to the beamsplitter.

11. A retractable video teleconferencing apparatus which comprises:
   I) a video monitor comprising a display having an optical axis; and
   II) an optical assembly which comprises:
      a) a housing mounted to the video monitor;
      b) means for moving the housing between a retracted position and a forward position in which the housing is positioned forward of the video monitor;
      c) a beamsplitter hingedly attached to the housing and movable between a first position in which the beamsplitter is positioned across the optical axis at an angle relative thereto, whereby optical images directed toward the display along the optical axis are at least partially reflected by the beamsplitter, and a second position in which the beamsplitter is retracted into the housing; and d) a video camera located in the housing and positioned relative to the beamsplitter for receiving the partially reflected images and for generating a video signal corresponding to the partially reflected images.

12. The apparatus according to claim 11 wherein the beamsplitter, in the first position, is mounted at a 45° angle relative to the optical axis.

13. The apparatus according to claim 12 wherein the housing further comprises at least one retractable wing extending laterally from the housing.

14. The apparatus according to claim 12 wherein the optical assembly further comprises an opaque panel positioned below the beamsplitter and hinged thereto.

15. A retractable video teleconferencing apparatus for a video monitor having an optical axis, the teleconferencing apparatus comprising:

a) a housing mounted to the video monitor;

b) means for moving the housing between a retracted position and a forward position in which the housing is positioned forward of the video monitor;

c) a beamsplitter hingedly attached to the housing and movable between a first position in which the beamsplitter is positioned across the optical axis at an angle relative thereto, whereby optical images directed toward the video monitor along the optical axis are at least partially reflected by the beamsplitter, and a second position in which the beamsplitter is retracted into the housing; and d) a video camera located in the housing and positioned relative to the beamsplitter for receiving the partially reflected images and for generating a video signal corresponding to the partially reflected images.

16. The apparatus according to claim 15 wherein the beamsplitter, in the first position, is mounted at a 45° angle relative to the optical axis.

17. The apparatus according to claim 15 wherein the video camera has a camera axis, the camera being mounted with the camera axis perpendicular to the optical axis.

18. The apparatus according to claim 15 wherein the means for moving the housing comprises a track mounted to the video monitor.

19. The apparatus according to claim 18 further comprising adjustable bracket means for securing the track to the video monitor.

20. The apparatus according to claim 15 wherein the housing further comprises at least one retractable wing extending laterally from the housing.

21. The apparatus according to claim 15 wherein the optical assembly further comprises an opaque panel positioned below the beamsplitter and hinged thereto.

* * * * *